United States Patent
Kappi (10) Patent No.: US 7,797,106 B2
(45) Date of Patent: Sep. 14, 2010

(54) SYSTEM AND METHOD FOR ADJUSTING STEP DETECTION BASED ON MOTION INFORMATION

(75) Inventor: Jani Kappi, Ylojarvi (FI)

(73) Assignee: Nokia Corporation, Espoo (FI)

( * ) Notice: Subject to any disclaimer, the term of this patent is extended or adjusted under 35 U.S.C. 154(b) by 1476 days.

(21) Appl. No.: 11/173,014

(22) Filed: Jun. 30, 2005

(65) Prior Publication Data

US 2007/0005246 A1 Jan. 4, 2007

(51) Int. Cl.
G01C 21/00 (2006.01)

(52) U.S. Cl. ...................................... 701/214
(58) Field of Classification Search .................. 701/214
See application file for complete search history.

(56) References Cited

U.S. PATENT DOCUMENTS

| | | | |
|---|---|---|---|
| 3,722,293 | A | 3/1973 | Morris |
| 5,583,776 | A | 12/1996 | Levi et al. |
| 5,663,847 | A | 9/1997 | Abramovitch |
| 6,522,266 | B1 | 2/2003 | Sochren et al. |
| 6,640,609 | B1 | 11/2003 | Nadkami et al. |
| 7,124,027 | B1 * | 10/2006 | Ernst et al. ................... 701/301 |
| 7,245,215 | B2 * | 7/2007 | Gollu et al. ............. 340/539.13 |
| 7,305,303 | B2 * | 12/2007 | Soehren et al. .............. 701/221 |
| 2002/0193080 | A1 | 12/2002 | Komsi et al. |
| 2003/0109258 | A1 * | 6/2003 | Mantyjarvi et al. ......... 455/440 |
| 2004/0020064 | A1 | 2/2004 | Levi et al. |
| 2005/0197769 | A1 * | 9/2005 | Soehren et al. .............. 701/220 |
| 2006/0176174 | A1 * | 8/2006 | Gollu et al. ............. 340/539.13 |
| 2006/0187028 | A1 * | 8/2006 | Kiang et al. ........... 340/539.13 |

FOREIGN PATENT DOCUMENTS

| | | |
|---|---|---|
| EP | 0 833 537 | 4/1998 |
| EP | 1 271 099 | 1/2003 |
| EP | 1 104 143 | 6/2009 |
| WO | WO 02/055964 A2 | 7/2002 |
| WO | WO 02/055964 A3 | 7/2002 |

OTHER PUBLICATIONS

International Preliminary Report on Patentability for PCT Application No. PCT/IB2006/001763 dated Jan. 17, 2008
International Search Report for PCT Application No. PCT/IB2006/001763 dated Dec. 5, 2006.
Translation of Korean Office Action for Korean Application No. 10-200-7001844 dated Jan. 4, 2010.

* cited by examiner

Primary Examiner—Thomas G Black
Assistant Examiner—Shelley Chen
(74) Attorney, Agent, or Firm—Foley & Lardner LLP (57) ABSTRACT

A system and method for changing the weighting accelerometer filtering based upon motion sensor measurements. Using measurements from motion sensors, one or more features can be extracted. This information is used by an algorithm to assign a most appropriate test feature class to be the class of the state of motion at a particular moment in time. This information is used to provide more accurate positioning information, and can also be used to power down the motion sensor at various times, providing an improvement in battery efficiency.

16 Claims, 6 Drawing Sheets

SYSTEM AND METHOD FOR ADJUSTING STEP DETECTION BASED ON MOTION INFORMATION

FIELD OF THE INVENTION

The present invention relates generally to electronic devices including global positioning systems. More particularly, the present invention relates to the accurate tracking of movements of electronic devices in a wide variety of situations and environments.

BACKGROUND OF THE INVENTION

Cellular telephones are used in a wide variety of different environments. People use cellular telephones while exercising, while driving an automobile, while watching television, and in countless other situations. These different environments, however, create a number of issues in terms of global positioning systems and sensor-based navigation systems for such devices. Navigation algorithms should be capable of performing properly regardless of the environment of the electronic device at any given moment. However, motion information is typically unknown to the navigation algorithm. The algorithm typically does not understand whether the device is being carried by an individual who is walking, riding in an automobile, or in any other type of activity.

Implementation of a motion sensor based navigation algorithm, particularly a pedestrian dead-reckoning (PDR) system, benefits greatly if the system is capable of identifying motion information so that a proper navigation algorithm can be selected. Traditional PDR systems are implemented assuming that that user is always walking or, in some cases, running. To ensure adequate navigation performance, and to be able to provide an improved user experience, autonomous motion tracking is therefore an essential feature.

Orientation algorithms utilizing accelerometers are based on measuring the direction of Earth's gravity vector. Due to basic principals of acceleration sensing, it is not possible to separate user-induced accelerations from gravity. This makes orientation measurement very unstable if the device is shaken or if the user is moving.

In many conventional systems, mean or median filtering is used to reduce motion-induced effects. However, in such systems, the orientation response becomes slow, and a certain amount of lag is introduced. This also occurs when there is no need to filter measurements, such as during periods of slow user movement.

During pedestrian navigation, step recognition algorithms search for footfall instances within a recognition window. The recognition window is predetermined to a generally applicable value. The performance of such algorithms varies depending upon the use case. Step detection algorithms are typically based upon peak- or zero-crossing-searches from accelerometer measurements. When an individual is walking, footfall frequency remains fairly constant. This makes it possible to predict when the next footfall will occur. However, during pedestrian navigation, different use situations and environments will affect a user's motions and movements. For example, a user may abruptly stop walking, the user might start running, or the electronic device may suddenly be moved to a different position on the user's body. These changes in motion and environment pose significant challenges to the step detection algorithm.

Another important issue for such navigation systems is power consumption. For a Global Navigation Satellite System (GNSS) receiver integrated into a cellular phone, power consumption becomes a serious issue. Because only a limited reservoir of power is available in a cellular telephone, every module inside the telephone ideally should consume as little power as possible. Possible modules inside the telephone include a GPS system, a Bluetooth receiver, a wireless local area network (WLAN) module, a camera, a cellular transmitter (Tx) and receiver (Rx), and motion sensors. All of these modules compete for power inside the telephone or other electronic device.

The limited power reservoir of the electronic device sets bounds for sensor activity during pedestrian navigation. It would be advantageous to be able to maintain the same level of performance with a reduced power-on time. Traditionally, the sensors in such systems have remained on at all times while navigating. However, this can severely drain power from the system, requiring frequent recharging and hindering the usefulness of the device.

There are many ways to reduce the power consumption of an electrical or electronic device. These methods include miniaturization, selecting less power consuming components, and implementing partial or complete module shutdowns. Partial or complete shutdowns are possible if the system maintains the same level of performance with the reduced power-on time. For example, integrated motion sensors can be utilized to extract motion information to implement the reduced power-on time functionality without suffering degradation in performance.

Additionally, the power consumption of the sensor unit is still quit high in such a system, although the GNSS receiver may be powered down. Conventionally, the sensor unit has used a constant sampling rate and therefore is always powered regardless of whether the device is moving or not and regardless of the user's particular motions. Furthermore, different applications require different frequency range for proper operation. A normal sampling rate for gesture recognition is around 100 Hz or more. In pedestrian navigation, 20-40 Hz is an adequate frequency range. Using activity/motion detection, sampling can be lowered to a much lower rate of around 3-5 Hz, if the device remains stationary. When the device is moved, the data rate is again increased.

SUMMARY OF THE INVENTION

The present invention provides a system and method for changing the weighting accelerometer filtering based upon motion sensor measurements. When there are only slow user movements, a higher weighting of accelerometer filtering is applied to a new measurement and vice versa. An orientation algorithm of the present invention is more responsive when there are only slow user movements, and the algorithm also remains stable when the device is shaken or the user is in motion. Using measurements from motion sensors, which may be attached or integrated into the electronic device or in a separate unit, one or more features can be extracted. For example, distance measurement or probability estimation features are compared to pre-defined test features. This information can be used by an algorithm to assign a most appropriate test feature class to be the class of the state of motion at a particular moment in time.

In the present invention, an individual sensor unit is powered down after each footfall occurrence, and does not power up until the next footfall search window begins. A prediction time is set and controlled utilizing a motion sensor-based motion-tracking algorithm, or a similar algorithm to identify the current motion. Utilizing a motion sensor based motion-tracking algorithm, or a similar algorithm, to identify the current motion, the step detection window can be automatically changed to the most appropriate value for the use case.

Figure 5:
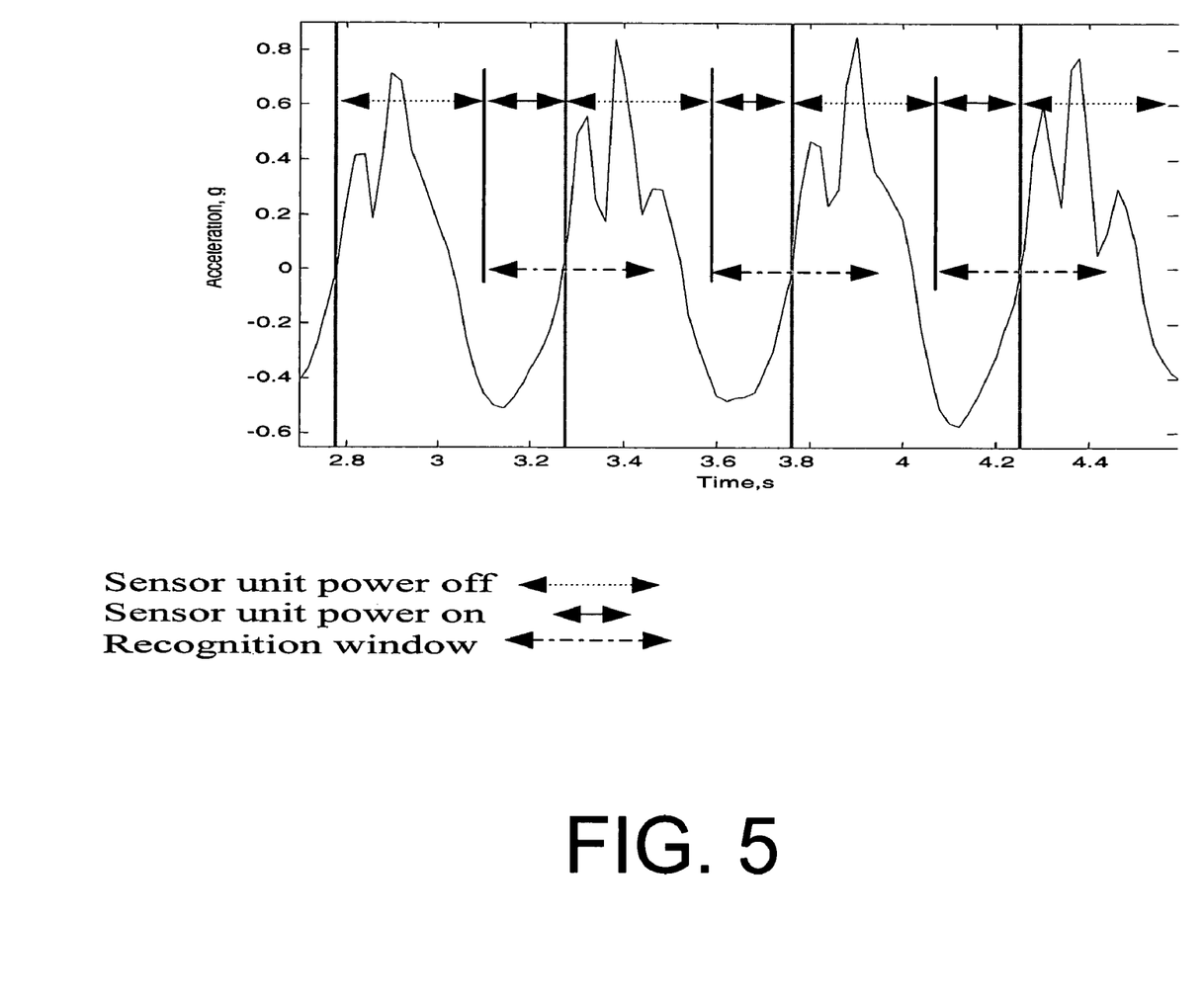
FIG. 5 is a plot showing an example of a variable detection window that is used with the predictive step detection algorithm.

With a variable window size, the step recognition accuracy increases and the algorithm operates in a more robust manner than in conventional systems. FIG. 5 is a plot showing an example of a variable detection window that is used with the predictive step detection algorithm. In FIG. 5, the acceleration of a sensor unit is shown as a function of time during a regular walking motion. In combination with predictive step detection algorithm, the sensor unit can be periodically switched off to save battery power. In FIG. 5, periods of time are shown where the sensor unit is powered off and on, respectively, as well as the respective recognition windows. Power saving can therefore be extended and made more precise using variable step detection algorithms. The present invention therefore provides an improvement on power consumption, an extended battery life for the electronic device without degrading positioning accuracy, and a more accurate performance level on different applications relative to the level of power consumption. The present invention also permits the implementation of automatic activity monitoring.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
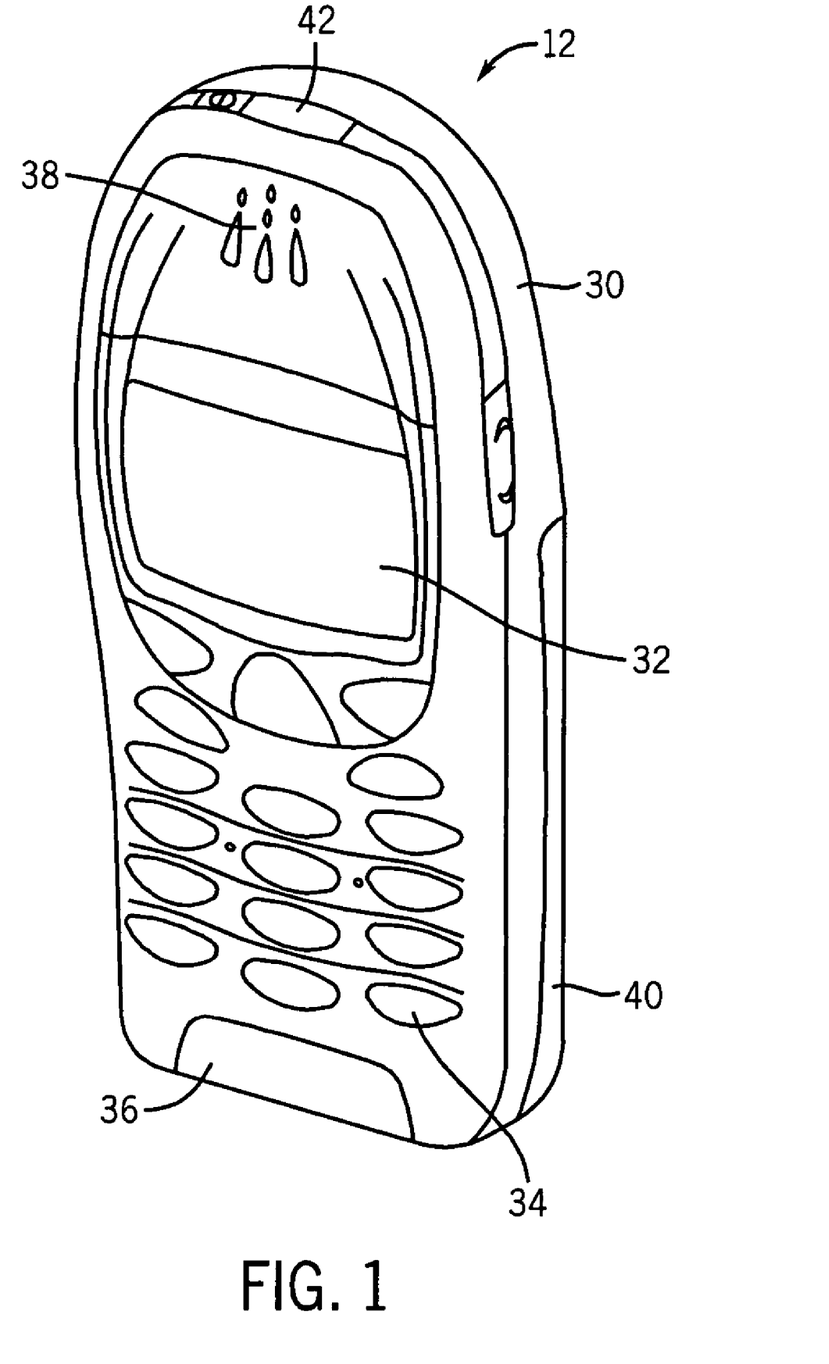
FIG. 1 is a perspective view of a mobile telephone that can be used in the implementation of the present invention.
Figure 2:
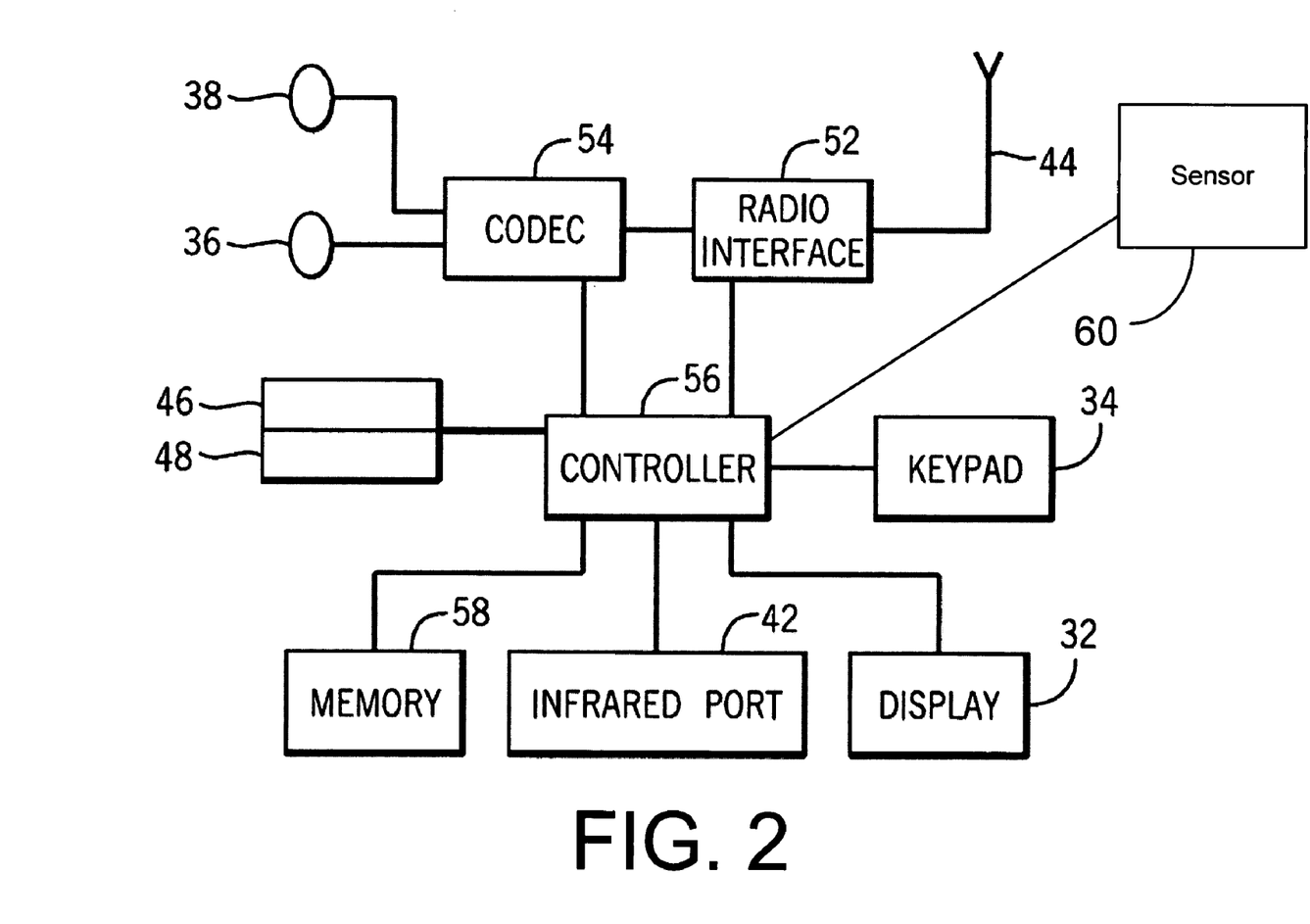
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. For example, the present invention can be incorporated into a combination personal digital assistant (PDA) and mobile telephone, a PDA, an integrated messaging device (IMD), a desktop computer, and a notebook computer. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. A motion sensor 60 is also operatively connected to the controller 56. Individual circuits and elements are all of a type well known in the art, for example in the Nokia range of mobile telephones.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (NMS), e-mail, Instant Messaging Service (IMS), Bluetooth, IEEE 802.11, etc.

The present invention involves changing the weighting of the accelerometer filtering based upon motion sensor measurements. When there are only slow user movements, a higher weighting of accelerometer filtering is applied to a new measurement and vice versa. A higher weighting of accelerometer filtering is used to filter out the higher percentage of "noise" in the signal that will occur in slower movements. Using measurements from motion sensors, which may be attached or integrated into the electronic device or in a separate unit, one or more features can be extracted. For example, distance measurement or probability estimation features are compared to pre-defined test features. This information is used to assign a most appropriate test feature class to be the class of the state of motion at a particular moment in time. This information can also be used to power down the sensor at various moments without sacrificing substantial system efficiency.

In one implementation of the present invention, multiple features are extracted from accelerometer measurements. Features are computed at a rate of one time per second from the acceleration magnitude using a two-second buffer. In this particular embodiment, the peak-to-peak value and the zero-crossing value (the number of times the value changes from positive to negative and vice versa after mean subtraction) are used as the relevant features.

Different motions are classified to six different classes according to one embodiment of the invention. These classes are: stationary, moving, walking, running, unknown, free-fall. Comparison with test features is performed using a log-multivariate probability density function (PDF) in one embodiment of the invention:

$$\log g_{[m,c]} = -0.5 \cdot (n \cdot \log(2\pi) + |C|) - 0.5 \cdot (x-m)^T C^{-1} (x-m),$$
where g is a probability estimate, C is a covariance matrix, m is a mean vector, and x is a n×1 feature vector.

In this case, the mean vector, m, is given by $$m = \frac{1}{n} \sum_n x_n,$$

and the covariance matrix, C, is given by $$C = \frac{1}{(M-1)} \sum_{i=1}^{M} (x_i - m)(x_i - m)^T,$$

where M is a number of vectors.

The matrix C is positive, semi-definite and symmetric by construction. Terms $n \cdot \log(2\pi) + |C|$ and $C^{-1}$ can be computed offline.

The calculated results are then weighted by computing the alignment cost:

$$-\log g(x_1 \ldots x_N, q_1 \ldots q_N | mOdel) = \left[ \sum_{i=1}^{N} -\log t(q_i | q_{i-1}) - \log g(x_i | q_i) \right] - \log t(q_{N+1} | q_N),$$

where t is a state transition cost and N is a number of states, q.

A different alignment or transition cost is applied to each class depending upon motion information from the previous computing cycle. The reported motion information is the class gained highest probability value.

Figure 3:
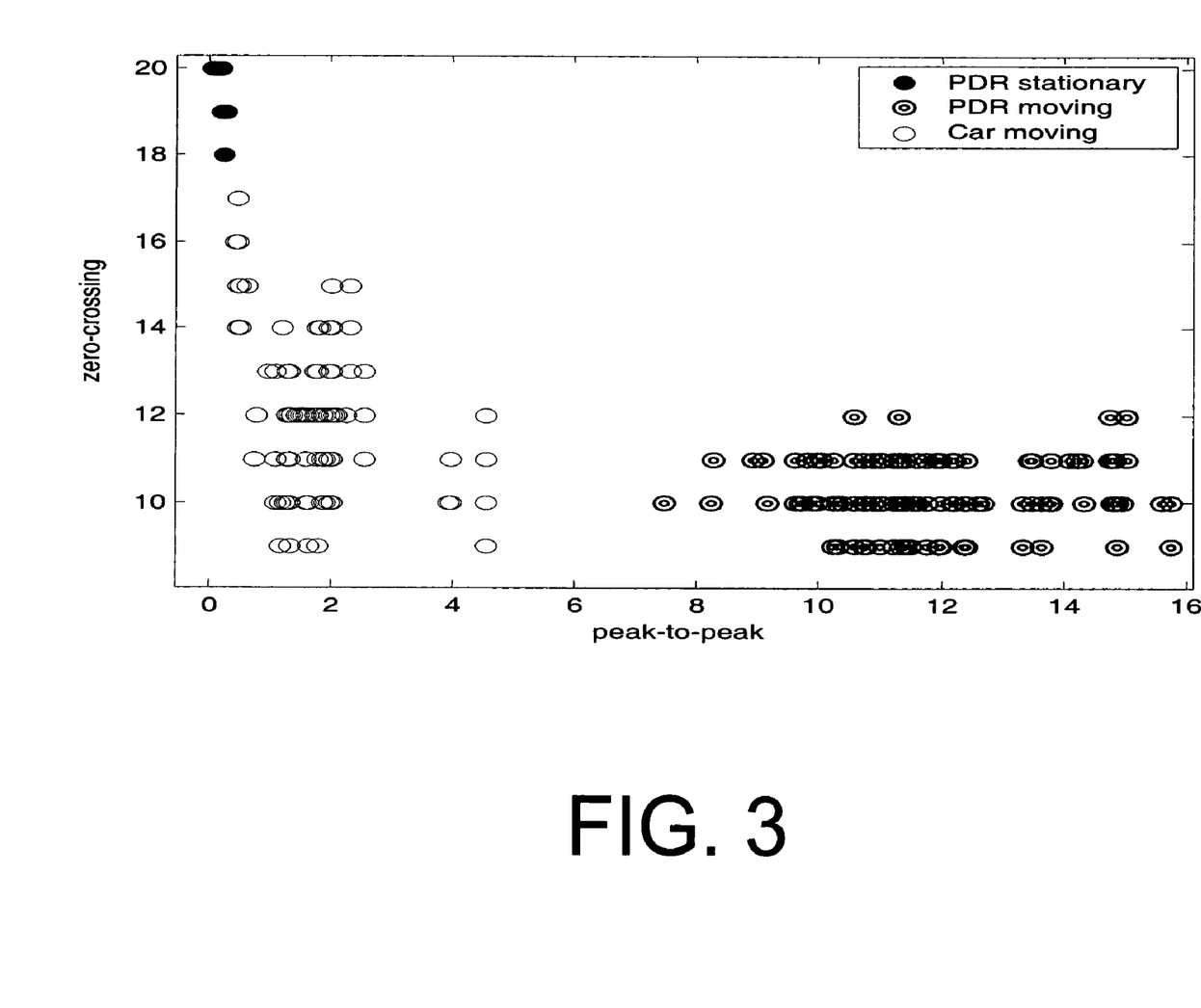
FIG. 3 is a plot showing the relationship between GPS speed, peak-to-peak values, and zero-crossing values obtained in tests of a GPS system within a moving automobile.
Figure 4:
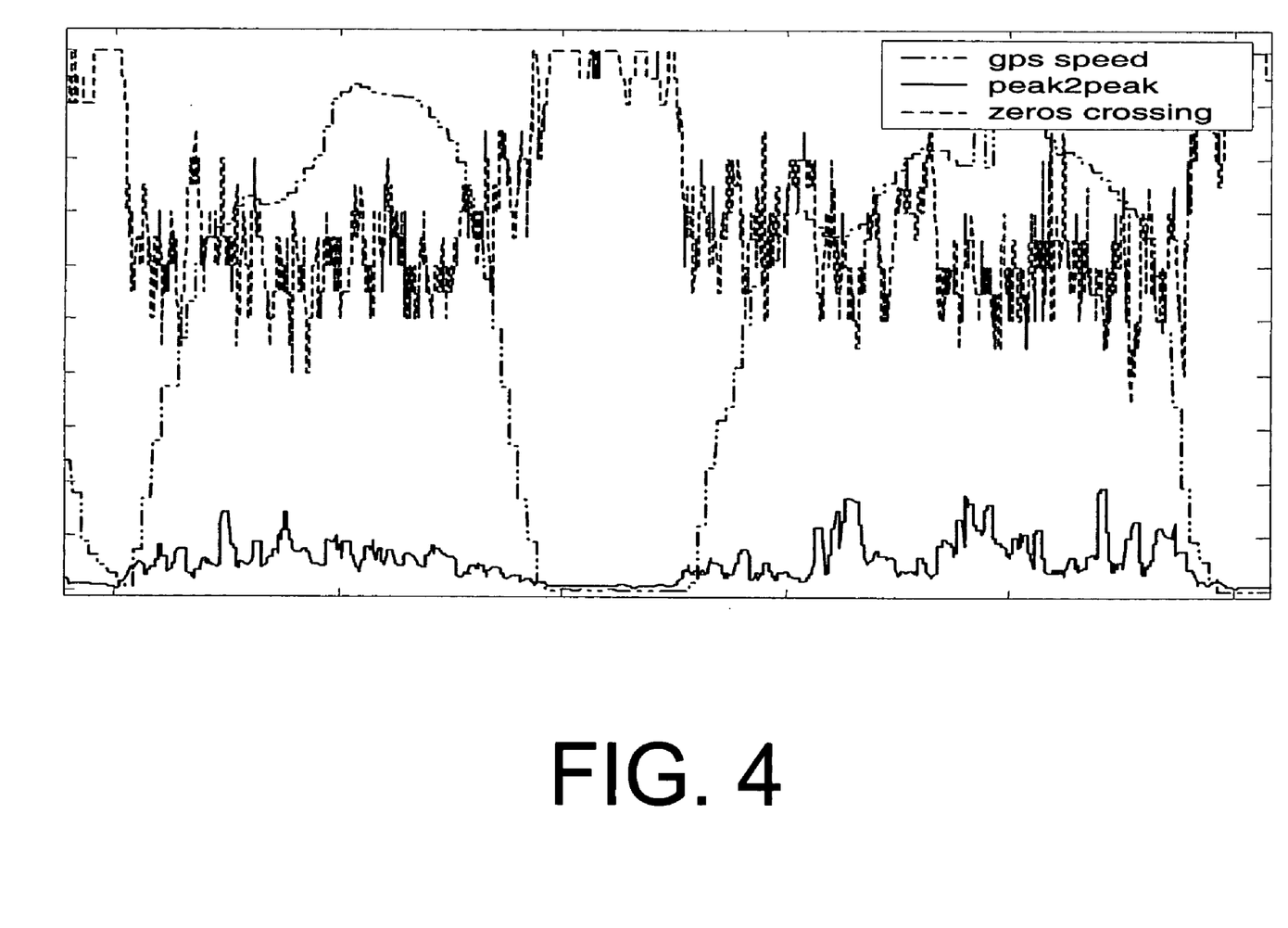
FIG. 4 is a plot comparing the peak-to-peak and zero-crossing values for a given module in "PDR stationary," "PDR moving," and "Car moving" environments.

Examples of the relationship between peak-to-peak values and zero-crossing values are depicted in FIGS. 3 and 4. In FIG. 3, the peak-to-peak and zeros-crossing parameter values are plotted, although with GPS speed measurement, for a test involving the GPS system in a moving automobile. FIG. 4 shows that, depending upon the particular movement at issue, this relationship between peak-to-peak values and zero-crossing values can vary significantly. For example, if an electronic device is in a moving vehicle, the ratio of the number zero-crossing values relative to the number of peak-to-peak values is quite high. Conversely, the ratio of peak-to-peak values to the number of zero-crossing values is much closer to 1:1 for an individual walking (according to PDR). When the individual is not walking or moving in a car, the zero-crossing value is also quite high relative to the peak-to-peak value.

As discussed above, the weighting of accelerometer filtering is changed based on motion sensor measurements. When only slow user movements are observed, a higher weighting of accelerometer filtering is applied to a new measurement. When faster movements are observed, a lower weighting of accelerometer filtering is applied to a new measurement.

Figure 6:
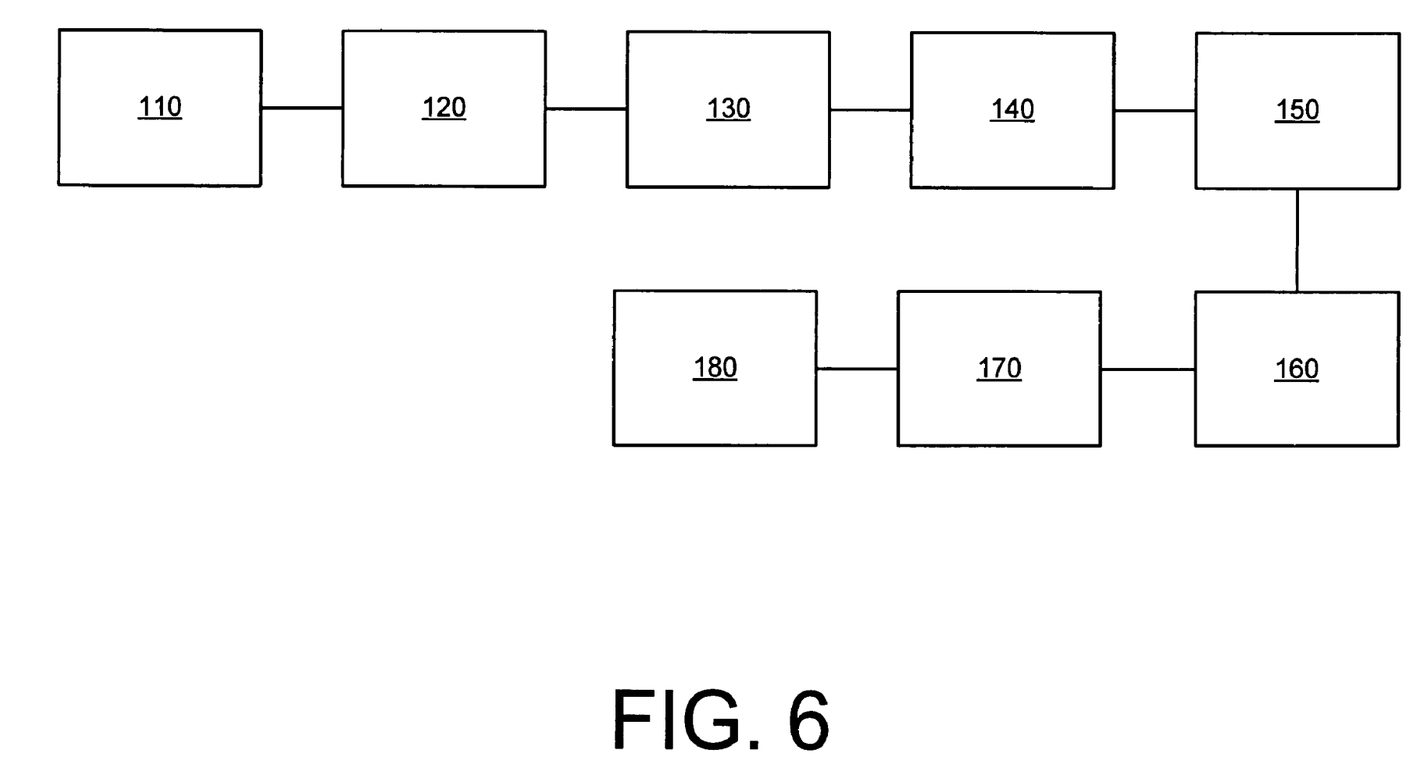
FIG. 6 is a flow chart showing the steps involved in the implementation of one embodiment of the present invention.

FIG. 6 is a flow chart showing the steps involved in the implementation of one embodiment of the present invention. At step 100, a plurality of predefined test feature classes are defined. These test feature classes can define various states of motion within which the module and/or electronic device may be traveling. Without limitation, these classes may include: stationary, moving, walking, running, unknown, and free-fall. At step 110, a motion sensor takes measurements related to the motion of the module and/or the electronic device. It should be noted that the motion sensor can be incorporated into the electronic device or a separate device. At step 120, one or more features are extracted from the measurements. At step 130, an algorithm is used to compare the one or more features to the predefined test feature classes. At step 140, the system selected the most appropriate test feature class based upon the comparison of step 130. With this method, the current motion state of the electronic device can be determined. This system therefore changes the weighting of the accelerator filtering at step 150 based upon the motion sensor measurements.

The present invention can also be used to aid in power conservation in the electronic device. At step 160 of FIG. 6, the algorithm is used to create a footfall search window. This search window will be different, for example, for a "walking" class versus a "running" class. At step 170, the motion sensor is powered down upon the occurrence of each footfall. As is shown in FIG. 5, this occurs when the acceleration magnitude moves from a negative state to a positive state compared to the mean value of the magnitude. At step 180, the sensor unit is powered on upon the initiation of the next footfall search window. As is shown in FIG. 5, steps 170 and 180 result in the motion sensor being powered on for only a relatively small percentage of time, instead of being powered on at all times. With a variable footfall window size (based upon the state of motion of the device), the footfall search window, also referred to as the step detection window, can be automatically adjusted for each movement class.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method improving position measurement of an electronic device, comprising:
    measuring movement of the electronic device;
    extracting feature information from the measured movement of the electronic device; and
    using the extracted feature information to adjust a filtering of information relating to the movement of the electronic device, wherein the using of the extracted feature information comprises:
    comparing the feature information to a plurality of test feature classes;
    selecting one of the plurality of test feature classes that most closely resembles the feature information;
    and using the selected test feature class for adjusting the filtering of information relating to the movement of the electronic device.

2. The method of claim 1, wherein the filtering of information is adjusted based upon an alignment cost for the selected test feature class.

3. The method of claim 1, wherein the plurality of test feature classes consist of stationary, moving, walking, running, unknown and free-fall classes.

4. The method of claim 1, further comprising the steps of:
creating a footfall search window based upon the selected test feature class, the footfall search window relating to the estimated amount of time between footfalls for the selected test feature class;
deactivating a sensor at the initiation of each footfall, the sensor being used to measure the movement of the electronic device;
reactivating the sensor at the initiation of the next footfall search window.

5. The method of claim 4, wherein the sensor comprises an accelerometer.

6. A computer program product stored on a non-transitory computer readable medium for improving position measurement of an electronic device, comprising:
computer code for measuring movement of the electronic device using a sensor;
computer code for extracting feature information from the measured movement of the electronic device; and
computer code for using the extracted feature information to adjust a filtering of information relating to the movement of the electronic device, wherein the computer code for using the extracted feature information comprises:
computer code for comparing the feature information to a plurality of test feature classes;
computer code for selecting one of the plurality of test feature classes that most closely resembles the feature information; and
computer code for using the selected test feature class to adjust the filtering of information relating to the movement of the electronic device.

7. The computer program product of claim 6, wherein a log-multivariate probability density function is used to compare the feature information to a plurality of predefined test feature classes.

8. The computer program product of claim 6, wherein the plurality of test feature classes consist of stationary, moving, walking, running, unknown and free-fall classes.

9. The computer program product of claim 6, further comprising:
computer code for creating a footfall search window based upon the selected test feature class, the footfall search window relating to the estimated amount of time between footfalls for the selected test feature class;
computer code for deactivating the sensor at the initiation of each footfall;
computer code for reactivating the sensor at the initiation of the next footfall search window.

10. An electronic device, comprising:
a processor; and
a memory unit including:
computer code for measuring movement of the electronic device using a sensor;
computer code for extracting feature information from the measured movement of the electronic device; and
computer code for using the extracted feature information to adjust a filtering of information relating to the movement of the electronic device, wherein the computer code for using the extracted feature information comprises:
computer code for comparing the feature information to a plurality of test feature classes;
computer code for selecting one of the plurality of test feature classes that most closely resembles the feature information; and
computer code for using the selected test feature class to adjust the filtering of information relating to the movement of the electronic device.

11. The electronic device of claim 10, wherein a log-multivariate probability density function is used to compare the feature information to a plurality of predefined test feature classes.

12. The electronic device of claim 10, wherein the memory unit further comprises:
computer code for creating a footfall search window based upon the selected test feature class, the footfall search window relating to the estimated amount of time between footfalls for the selected test feature class;
computer code for deactivating the sensor at the initiation of each footfall;
computer code for reactivating the sensor at the initiation of the next footfall search window.

13. A module, comprising:
a processor;
a sensor operatively connected to the processor; and
a memory unit operatively connected to the processor and including:
computer code for measuring movement of the electronic device using the sensor,
computer code for extracting feature information from the measured movement of the electronic device, and
computer code for using the extracted feature information to adjust a filtering of information relating to the movement of the electronic device, wherein the computer code for using the extracted feature information comprises:
computer code for comparing the feature information to a plurality of test feature classes,
computer code for selecting one of the plurality of test feature classes that most closely resembles the feature information, and
computer code for using the selected test feature class to adjust the filtering of information relating to the movement of the electronic device.

14. The module of claim 13, wherein a log-multivariate probability density function is used to compare the feature information to a plurality of predefined test feature classes.

15. The module of claim 13, wherein the memory unit further comprises:
computer code for creating a footfall search window based upon the selected test feature class, the footfall search window relating to the estimated amount of time between footfalls for the selected test feature class;
computer code for deactivating the sensor at the initiation of each footfall;
computer code for reactivating the sensor at the initiation of the next footfall search window.

16. The module of claim 13, wherein the sensor comprises an accelerometer.

* * * * *